(12) United States Patent
Broerman

(10) Patent No.: US 7,047,313 B1
(45) Date of Patent: May 16, 2006

(54) METHOD FOR REDIRECTING PACKETIZED DATA ASSOCIATED WITH A DESTINATION ADDRESS IN A COMMUNICATION PROTOCOL LAYER TO A DIFFERENT DESTINATION ADDRESS IN A DIFFERENT PROTOCOL LAYER

(75) Inventor: Keith Robert Broerman, Carmel, IN (US)

(73) Assignee: Thomas Licensing, Boulogne-Billancourt (FR)

(*) Notice: Subject to any disclaimer, the term of this patent is extended or adjusted under 35 U.S.C. 154(b) by 529 days.

(21) Appl. No.: 09/644,337

(22) Filed: Aug. 23, 2000

Related U.S. Application Data

(60) Provisional application No. 60/174,565, filed on Jan. 5, 2000.

(51) Int. Cl.
*G06F 15/16* (2006.01)

(52) U.S. Cl. .................................................. 709/238

(58) Field of Classification Search ................ 709/238, 709/218, 230, 245
See application file for complete search history.

(56) References Cited

U.S. PATENT DOCUMENTS

| | | | |
|---|---|---|---|
| 5,355,365 A | 10/1994 | Bhat et al. | 370/85.13 |
| 5,666,487 A | 9/1997 | Goodman et al. | 395/200.7 |

FOREIGN PATENT DOCUMENTS

| | | |
|---|---|---|
| WO | WO98/47310 | 10/1998 |

(Continued)

OTHER PUBLICATIONS

"The Convergence of Layer 2 and Layer 3 in Today's LAN", Foundry Networks, Gigabit Info Center, Improving Performance; http://www.foundrynet.com/wpvol3.html, Jul. 27, 2000, pp. 1-13.

(Continued)

*Primary Examiner*—David Y. Eng
(74) *Attorney, Agent, or Firm*—Joseph S. Tripoli; Ronald H. Kurdyla; Joel M. Fogelson

(57) ABSTRACT

A system enables a bi-directional communication device such as a modem to facilitate local communication between the modem and an attached PC as well as to enable the PC to conduct concurrent Internet and local communication. A bi-directional communication system employs a method for seamlessly communicating packetized data between different networks using hierarchical layers of communication protocols (e.g. including Internet Protocol (IP) and Media Access Control (MAC) layers). The method involves comparing a received IP packet destination address in a first protocol layer with a predetermined IP address to determine if there is an address match. Upon such an address match, a payload of the received IP packet is redirected from an Internet network to a local network (e.g. an Ethernet, HPNA or USB network) by substituting a second protocol layer address for a received second protocol layer address (e.g. a MAC address). In another feature, a second Application (e.g. peripheral control) is initiated to operate concurrently with a first Application (e.g. web surfing) in response to receiving the redirected payload data.

19 Claims, 7 Drawing Sheets

U.S. PATENT DOCUMENTS

| | | | | |
|---|---|---|---|---|
| 5,790,548 | A | 8/1998 | Sistanizadeh et al. | 370/401 |
| 5,884,024 | A | 3/1999 | Lim et al. | 395/187 |
| 5,961,604 | A | 10/1999 | Anderson et al. | 709/229 |
| 6,006,265 | A | 12/1999 | Rangan et al. | 709/226 |
| 6,012,088 | A | 1/2000 | Li et al. | 709/219 |
| 6,049,826 | A | 4/2000 | Beser | 709/222 |
| 6,061,796 | A | 5/2000 | Chen et al. | 713/201 |
| 6,377,990 | B1 * | 4/2002 | Slemmer et al. | 709/225 |
| 6,640,251 | B1 * | 10/2003 | Wiget et al. | 709/238 |

FOREIGN PATENT DOCUMENTS

| | | |
|---|---|---|
| WO | WO99/30449 | 6/1999 |

OTHER PUBLICATIONS

*"DOCSIS Cable Device MIB—Cable Device Management Information Base for DOCSIS Compliant Cable Modems and Cable Modem Termination Systems,"* Network Working Group, RFC: 2669, Category: Proposed Standard, Aug. 1999.

IETF RFC 2663, P. Srisuresh, M. Holdrege, "IP Network Address Translator (NAT) Terminology & Considerations", Aug. 1999.

(EPO Communication Pursuant to Article 96(2) dated May 18, 2004 attached).

* cited by examiner

METHOD FOR REDIRECTING PACKETIZED DATA ASSOCIATED WITH A DESTINATION ADDRESS IN A COMMUNICATION PROTOCOL LAYER TO A DIFFERENT DESTINATION ADDRESS IN A DIFFERENT PROTOCOL LAYER

This is a non-provisional application of provisional application Ser. No. 60/174,565 by K. Broerman, filed Jan. 5, 2000.

FIELD OF THE INVENTION

This invention concerns a bi-directional Internet compatible communication system for re-routing packetized data associated with a destination address to Applications in a cable modem, computer, TV, VCR, or an associated peripheral device.

BACKGROUND OF THE INVENTION

Home entertainment systems increasingly include both Personal Computer and television functions (PC/TV functions) involving multiple source and multiple destination communication. Such a system may receive data from satellite or terrestrial sources comprising High Definition Television (HDTV) broadcasts, Microwave Multi-point Distribution System (MMDS) broadcasts and Digital Video Broadcasts (DVB). Such a system may also provide high speed Internet access through a broadcast link or a coaxial link (e.g. cable TV lines) using a cable modem or via a telephone line link using an ADSL or ISDN (Asynchronous Digital Subscriber Line or Integrated Services Digital Network) compatible modem, for example. A home entertainment system may also communicate with local devices using different communication networks. Such local devices include Digital Video Disk (DVD), CDROM, VHS, and Digital VHS (DVHS™) type players, PCs, set top boxes and many other types of devices.

It is desirable for home entertainment systems, supporting Internet compatible bi-directional communication using cable and other types of modems, to be able to seamlessly communicate with networked devices on different networks. For example, such a home entertainment system may communicate on Ethernet, Home Phoneline Networking Alliance (HPNA) or Universal Serial Bus (USB) local networks. These requirements and associated problems are addressed by a system according to the present invention.

SUMMARY OF THE INVENTION

A bi-directional communication system employs a method for seamlessly communicating packetized data between different networks using hierarchical layers of communication protocols (e.g. including Internet Protocol (IP) and Media Access Control (MAC) layers). The method involves comparing a received IP packet destination address in a first protocol layer with a predetermined IP address to determine if there is an address match. Upon such an address match, a payload of the received IP packet is redirected from an Internet network to a local network by substituting a second protocol layer address for a received second protocol layer address (e.g. a MAC address). In another feature, a second Application (e.g. peripheral control) is initiated to operate concurrently with a first Application (e.g. web surfing) in response to receiving the redirected payload data.

DETAILED DESCRIPTION OF THE DRAWINGS

A bi-directional communication system (e.g. a cable modem) supports seamless communication of packetized data between different networks using hierarchically organized communication protocols. A packet classifier and MAC frame header editing function (a network filter) is advantageously incorporated in the cable modem system to support the operation of local applications by Customer Premise Equipment (CPE) such as a PC that is attached to the modem. Such Applications may include, for example, (a) home appliance control, e.g., heating control, (b) peripheral control, e.g., TV or VCR or DVD control, (c) a communication function, e.g., between different appliances in a home, (d) a diagnostic function, e.g., for a cable modem diagnostics function and (e) secure private internet or intranet communication functions, e.g., Email between different home PCs. The use of the network filter in a cable modem enables CPE devices on local networks (e.g. Ethernet, USB or HPNA networks), to directly exchange data through the modem using a hierarchically organized communication protocol comprised of multiple protocol layers. These layers may include Internet Protocol (IP) and Media Access Control (MAC) layers, for example.

Figure 1:
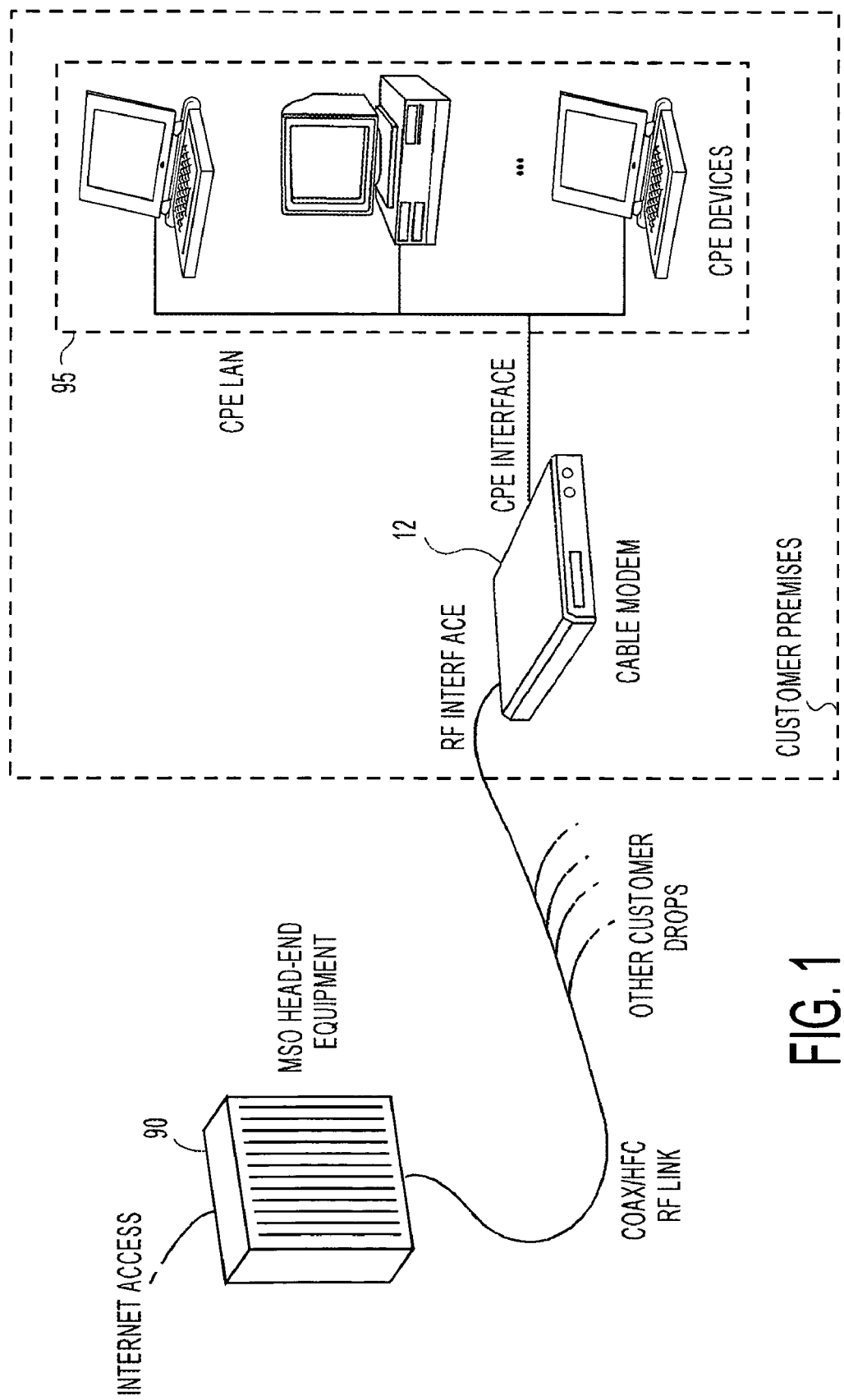
FIG. 1 provides a simplified overview of a packet-switched network consisting of remotely-located cable company head-end equipment, a customer owned or leased cable modem, and its attached Customer Premise Equipment (CPEs.), according to the invention.

The use of the network filter in the modem also advantageously eliminates a manual configuration operation within an attached PC, and enables concurrent communication, (a) between the PC and the Internet and (b) between the PC and the cable modem. The communication between the PC and modem is used to support local Applications such as a diagnostics Application as may be described by reference to the system of FIG. 1. The system of FIG. 1 comprises a packet-switched network consisting of remotely-located MSO (Multiple System Operator) cable company head-end equipment 90, a customer owned or leased cable modem 12, and its attached Customer Premise Equipment (CPE) 95. As an illustration, in the system of FIG. 1, one of the CPE devices 95 communicates to the Internet via cable modem 12 and head-end equipment 90 and also concurrently downloads diagnostics information from modem 12. The head-end 90 typically provides Internet Service Provider (ISP) functionality such that CPE devices 95 may connect to the Internet, browse the World Wide Web, perform FTP file transfers and exchange email, etc.

The cable modem of system 12 implements applications involving local communication such as multiple diagnostic Applications, for example. The diagnostic Applications communicate with CPE equipment 95 using a network IP address that is constrained to a particular fixed value (different from the IP address assigned to system 12) by the multiple system operator (MSO) of head end 90. Further, CPE 95 typically resides on a different logical network or subnetwork than the diagnostics Application. As a result there are problems involved in, (a) configuring CPE network parameters to support local communication between modem system 12 and CPE 95, and in (b) maintaining Internet communication between CPE 95 and a remote source accessed via head end 90 (e.g., for web surfing), whilst concurrently maintaining communication between system 12 and CPE 95 for local (e.g., diagnostic) applications. Specifically, in order to enable CPE 95 to access diagnostics information in system 12, it is necessary to configure CPE 95 to reside on the same logical network as that used by the system 12 diagnostics application. One way to address this problem is to temporarily reconfigure the CPE 95 network address such that the CPE device resides on the same network as the modem diagnostic Applications. This ensures that CPE 95 and system 12 are directly connected from a network protocol perspective. However, such a configuration operation is a non-trivial and error-prone task requiring a User to determine a valid network address and subnet mask as well as requiring a User to follow a detailed procedure to enter configuration values and activate them in a CPE device. In order to set a fixed network address on a Microsoft Windows PC requires that a User enters its Network Setup control menu, changes existing options, enters the correct parameters, and reboots the PC. This operation requires capabilities likely to be beyond the majority of the PC-literate population. Moreover, once the CPE network address has been fixed for this purpose, the CPE device no longer resides on the same logical network as the head-end and the CPE device (e.g., a PC) is unable to concurrently browse the Internet or exchange email.

Figure 2:
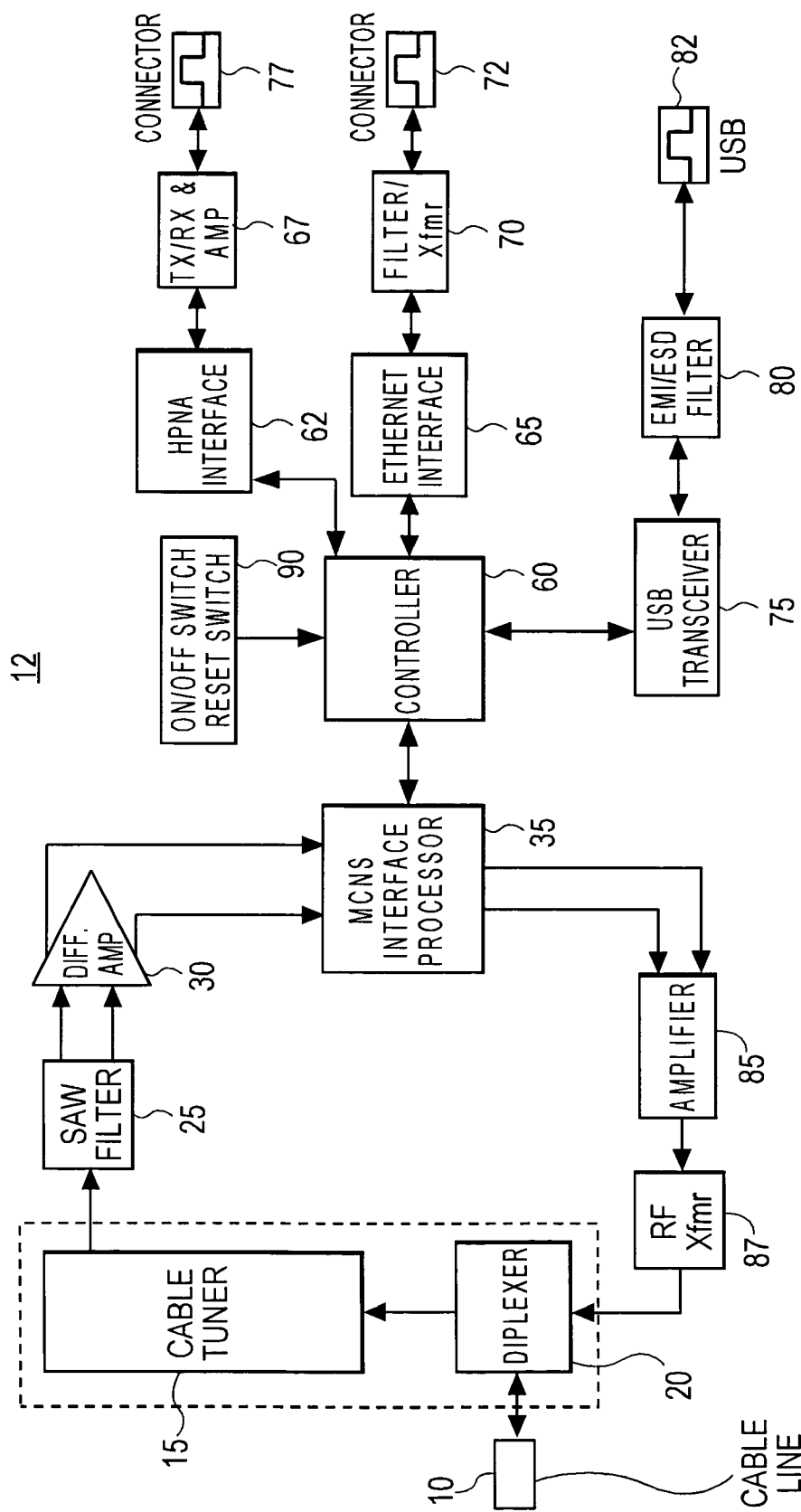
FIG. 2 shows a cable modem system, according to the invention.

The exemplary embodiment of system 12 of FIG. 2 addresses these problems by advantageously incorporating a packet classifier and MAC frame header editing function (a network filter). This eliminates the need to manually fix the network address of a CPE device in order to perform a local network function such as exchanging diagnostics data with the cable modem 12, for example. It also permits the CPE device to simultaneously browse the Web while exchanging modem diagnostics data. System 12 of FIG. 2 supports cable modem bridging communication between the Internet (through the CATV head end) and local area network (LAN) devices (including PCs). Further, the bi-directional communications between system 12 and the CATV head-end are in a multi-layered protocol format illustrated in FIG. 7.

Figure 7:
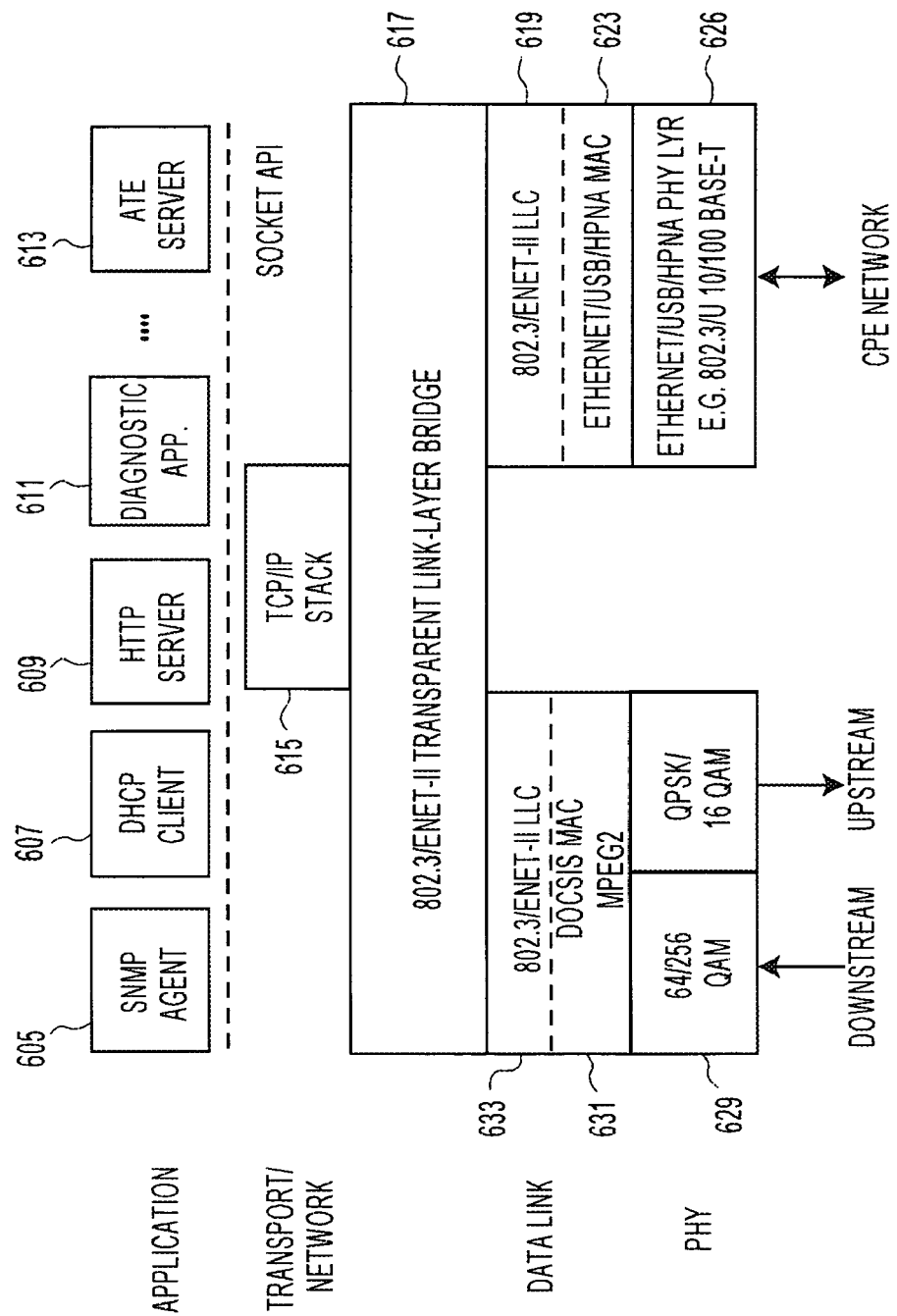
FIG. 7 shows the hierarchically layered communication protocols used in a bi-directional communication system, according to the invention.

The multi-layered protocol format illustrated in FIG. 7 involves a QAM (Quadrature Amplitude Modulation) or QPSK (Quadrature Phase Shift Keying Modulation) physical layer 629 for upstream communication between system 12 and the head end (via line 10 of FIG. 2). This physical layer conveys MPEG2 (Moving Pictures Expert Group) transport protocol data conveying DOCSIS MAC (Media Access Control) data frames 631. The MAC data conveys Ethernet-II/802.3 logical link control data frames 633 or MAC management data and the Ethernet data in turn conveys IP layer data. The cable modem also maintains a return communication path to the CATV head-end employing the hierarchically ordered 633, 631 and 629 protocol layers for Time Division Multiplexed communication of return data in Ethernet protocol.

The encompassing physical layer data transmitted from the CATV head-end to the cable modem is processed for Ethernet communication in 802.3 Ethernet data frames by Ethernet transparent link layer bridge 617 or is converted to USB or HPNA format by USB/MAC layer 623. In communicating via port 72 (FIG. 2) in Ethernet format, the Ethernet-II/802.3 data 619 provided by bridge 617 is encapsulated as MAC layer data 623 for communication in Ethernet-II/802.3 physical layer format 626 to attached LAN devices on port 72. Similarly, in communicating via ports 82 and 77 (FIG. 2) in USB and HPNA format respectively, the Ethernet-II/802.3 data 619 provided by bridge 617 is encapsulated in USB MAC layer or HPNA MAC layer data frames 623 for communication in USB or HPNA physical layer format 626 to attached LAN devices on ports 82 and 77.

The cable modem maintains bi-directional communication with the LAN devices and also receives data from the devices in corresponding Ethernet, USB or HPNA protocol. In other embodiments, system 12 may maintain bi-directional communication with LAN devices via other methods including 802.11 and 'Bluetooth' data links.

The data received from both the CATV head-end and attached CPE devices may be bridged (forwarded) to the opposite interface or passed to TCP/IP stack 615 (FIG. 7). TCP/IP stack 615 provides protocol layering and delayering of data in communicating between link layer bridge 617 and a socket Application Programming Interface (API) used by internal software Applications. The internal software Applications include SNMP (System Network Management Protocol) application 605, DHCP (Dynamic Host Configuration Protocol) application 607, HTTP server 609, Diagnostic Application 611 and ATE (Automatic Test Equipment) server 613.

The cable modem described herein employs an MPEG compatible protocol conforming to the MPEG2 image encoding standard, termed the "MPEG standard". This standard is comprised of a system encoding section (ISO/IEC 13818-1, Jun. 10, 1994) and a video encoding section (ISO/IEC 13818- Jan. 20, 1995). The Internet TCP/IP (Transmission Control Protocol/Internet Protocol) and Ethernet compatible protocols described herein provide compatibility with the Multimedia Cable Networks Systems (MCNS) preliminary requirements and DOCSIS 1.0 (Data Over Cable Service Interface Specification 1.0) requirements ratified by the International Telecommunications Union (ITU) March 1998 and as specified in RFC 2669 (Request For Comment Document 2669). The RFC documents are available via the Internet and are prepared by Internet standards working groups.

The principles of the invention may be applied to any bi-directional communication system and are not restricted to cable, ADSL, ISDN or conventional type modems. Further, the disclosed system processes Internet Protocol (IP) data from a variety of Internet sources including streamed video or audio data, telephone messages, computer programs, Emails or other packetized data and communications, for example.

The cable modem (system 12) of FIG. 2 communicates with a CATV head-end over a bi-directional broadband high speed RF link on line 10 which typically consists of coaxial cable or hybrid fiber/coax (HFC). The modem system 12 bi-directionally communicates with devices located at a User site over local area networks (LANs). Typical User-side local area networks include Digital/Intel/Xerox Ethernet compatible networks attached via connector 72. Other User-side devices communicate via a Universal Serial Bus (USB) or HPNA compatible networks attached via connectors 82 and 77 respectively. User devices attached on the Ethernet, HPNA and USB networks may include equipment such as personal computers (PCs), network printers, video receivers, audio receivers, VCRs, DVDs, scanners, copiers, telephones, fax machines and home appliances, for example.

In operation, diplexer 20 of cable modem system 12 of FIG. 2 separates upstream communications (sent from modem 12 to a CATV head-end) from downstream communications (sent from a CATV head-end to modem 12) conveyed via cable line 10. Diplexer 20 separates upstream data from downstream data based on the different frequency ranges that the upstream data (typically 5–42 MHz) and downstream data (typically 92–855 MHz) respectively employ. Controller 60 configures the elements of cable modem 12 of FIG. 2 to receive MPEG2 transport data from the CATV head-end on cable line 10 and to convert the data to Ethernet, USB or HPNA compatible format for output via ports 72, 82 and 77 respectively. Similarly, controller 60 configures the elements of cable modem 12 of FIG. 2 to receive Ethernet, USB or HPNA compatible data from ports 72, 82 and 77 and to convert and transmit MPEG2 transport protocol data to the CATV head-end on cable line 10. Controller 60 configures the elements of system 12 through the setting of control register values within these elements using a bi-directional data and control signal bus. Specifically, controller 60 configures tuner 15, saw filter 25, differential amplifier 30 and MCNS (Multimedia Cable Networks Systems) interface device 35 to receive a DOCSIS formatted signal on a previously identified RF channel frequency. The DOCSIS formatted signal comprises an MPEG2 transport protocol format conveying Ethernet compatible data frames including IP data content.

Controller 60 employs an initialization process to determine the RF channel frequency that tuner 15 is to be configured to receive. The initialization process involves iteratively tuning to successive candidate RF channel frequencies until a DOCSIS compliant signal is obtained. Controller 60 recognizes a DOCSIS compliant signal on a candidate channel through the successful decode by MCNS interface processor 35 of the received data and through a correspondingly acceptable error rate for the decoded data. In the initialization process, controller 60 in conjunction with MCNS interface 35, amplifier 85 and RF transformer 87, also transmits data upstream to the CATV head-end for a variety of purposes including for adaptively and iteratively adjusting upstream and downstream communication parameters. These parameters include cable modem transmission power level and timing offset, for example.

Following initialization and in normal operation, an RF carrier is modulated with MPEG2 transport protocol data using 64 or 256 QAM (Quadrature Amplitude Modulation). The MPEG2 transport data includes Ethernet formatted data which in turn includes IP data representing a User requested HTML (HyperText Mark-Up Language) web page, for example. The MPEG transport data is provided by diplexer 20 to tuner 15. Tuner 15 down-converts the input signal from diplexer 20 to a lower frequency band which is filtered by saw filter 25 to enhance signal isolation from neighboring RF channels. The filtered signal from unit 25 is level shifted and buffered by differential amplifier 30 to provide a signal compatible with MCNS interface processor 35. The resultant down converted, level-shifted signal from amplifier 30 is demodulated by MCNS processor 35. This demodulated data is further trellis decoded, mapped into byte aligned data segments, deinterleaved and Reed-Solomon error corrected within processor 35. Trellis decoding, deinterleaving and Reed-Solomon error correction are known functions described, for example, in the reference text *Digital Communication*, Lee and Messerschmidt (Kluwer Academic Press, Boston, Mass., USA, 1988). Processor 35 further converts the MPEG2 format data to Ethernet data frames that are provided to controller 60.

Controller 60 parses and filters the Ethernet compatible data from unit 35 using filters configured from the CATV head-end. The filters implemented by controller 60 match data identifiers in incoming Ethernet frame packets provided by unit 35 with identifier values pre-loaded from the CATV head-end. The identifier values are pre-loaded during a previously performed initialization or configuration operation. By this means controller 60 implements a data admission control function forwarding selected data to local LAN devices and discarding other selected data content. This configurable filter system may be advantageously used to filter data based on metadata items in the incoming data for a variety of purposes including based on, (a) content rating for parental or other blocking control, (b) predetermined User preferences for targeting advertisements and "push-content", (c) firewall filtering, (d) identity of source, and (e) a data search function. The filtered Ethernet compatible serial data is communicated to a PC via Ethernet interface 65, filter and isolation transformer 70 and port 72. Interface 65 buffers and conditions the data from controller 60 for filtering and transforming by unit 70 for output to a PC via port 72.

In similar fashion, controller 60 converts and filters data (conveyed in Ethernet MAC frames) from processor 35 for output in USB format via port 82 or in HPNA format via port 77. The USB data is buffered by transceiver 75 and filtered by noise and interference suppression (EMI/ESD) filter 80 prior to output to USB compatible LAN devices connected to port 82. Similarly, the HPNA data is conditioned by interface 62 and buffered by transceiver amplifier 67 prior to output to HPNA compatible LAN devices connected to port 77.

Modem system 12 also communicates data upstream from an attached PC, for example, to a CATV head-end. For this purpose, controller 60 of system 12 receives Ethernet compatible data from the attached PC via port 72, interface 65 and filter/isolation transformer 70 and provides it to processor 35. Processor 35 modulates an RF carrier with the received Ethernet format data using 16 QAM or QPSK (Quadrature Phase Shift Keying Modulation). The resultant modulated data is time division multiplexed onto cable line 10 for upstream communication via amplifier 85, transformer 87 and diplexer 20. Amplifier 85 outputs the data to the CATV head-end with an appropriate power level selected in the previously described initialization process. Transformer 87 provides a degree of fault and noise isolation in the event of a failure in the modem 12 or upon the occurrence of locally generated noise in the modem or in attached devices.

In similar fashion, modem system 12 also communicates data upstream from devices attached via USB port 82 or via HPNA port 77. In an exemplary implementation, controller 60 of system 12 receives Ethernet compatible data from transceiver 75 and provides it to processor 35 for upstream communication in the manner previously described. For this purpose, transceiver 75 receives Ethernet data encapsulated within USB frames from port 82 via filter 80 and removes the USB frame data to provide Ethernet format data to controller 60. Similarly, interface 62 receives data encapsulated in HPNA format from port 77 via transceiver 67 and provides Ethernet format data to controller 60.

Controller 60 is also responsive to on/off and reset switch 90 and performs a variety of functions in addition to those already described. Controller 60 configures modem 12 parameters using configuration information provided from a CATV head-end. Controller 60 also directs system 12 in synchronizing and multiplexing upstream communication onto cable line 10 and implements a rate limit in controlling upstream data traffic. Further, controller 60 bi-directionally filters received data and provides selected data to either the CATV head-end or LAN devices attached to ports 72, 77 and 82. Controller 60 also supports data ranging communication with the CATV head-end. The ranging communication is initiated by the CATV head-end and comprises the continuous but intermittent polling of individual modems to determine status and to identify modem or line failures.

System 12 also uses a network filter operating under the direction of controller 60 to advantageously intercept packets (from a CPE device destined for the CATV head-end) and replace the destination MAC address with the diagnostic interface MAC address of modem system 12. This results in the packet being directed to TCP/IP stack (stack 615 of FIG. 7) and not to the CATV head end, and makes modem system 12 appears to reside on the same logical network as the attached CPE device. This interception mechanism and apparent direct connection addresses the previously described problems of, (a) configuring network parameters to support local communication between modem system 12 and attached CPE devices, and (b) concurrently maintaining Internet communication between a CPE device and the Internet via system 12, whilst concurrently maintaining communication between system 12 and the CPE device for local, e.g., diagnostic Applications.

These problems arise because an IP address that may be allocated for local, e.g., diagnostic Applications, in system 12 is constrained to be a fixed value. Such a constraint may occur, for example, because it is required by a proprietary equipment sourcing specification or because another body such as IANA (Internet Assigned Numbers Authority) has defined fixed values, or a fixed range of predetermined values, as addresses for specific tasks. The IP address range 192.168.xx.xx, has been defined by the IANA as one of a small number of local private networks that should not be assigned to a real public network, for example. Therefore, a gateway router filtering Internet data traffic received via the CATV head end discards traffic with 192.168.xx.xx destination IP addresses. This is so unless the router has been specifically configured to route 192.168.xx.xx packets, which is unlikely.

A specific illustration of how a problem occurs because of the reservation of a fixed, non-public use IP address for particular applications follows. Firstly, it is assumed IP address 192.168.100.1 has been designated for use for cable modem diagnostic Applications. It is also assumed that an attached CPE device is assigned a dynamic IP address of 172.10.2.65 from a head-end DHCP server. A User of the attached CPE device, desiring to browse modem diagnostic web pages (at 192.168.100.1), enters a corresponding URL of system 12, e.g., www.rca_modem.com, via a web browser resident in the CPE device. An Internet Domain Name Resolution request generated by the browser is submitted by the CPE device to system 12 for forwarding and translation of the Domain Name entered by the User into a corresponding IP address of the source of the requested web page. An Intercepting Domain Name server in system 12 advantageously intercepts the Domain Name Resolution request and uses an intercepting Domain Name database in translating the intercepted Domain Name (here www.rca_modem.com) to an IP compatible address and communicates the IP address (here 192.168.100.1) back to the requesting CPE device.

However, the CPE device is unable to directly send packets to the identified IP address 192.168.100.1. This is because, as previously noted, the assigned IP address of the CPE is 172.10.2.65 and consequently the CPE does not reside on the same logical network as the diagnostic Application of system 12 (IP address 192.168.100.1). As a result the CPE forwards the packets to the head-end and the gateway router determines where to send them. For this purpose, the CPE device encapsulates the IP packet destined for 192.168.100.1 in an Ethernet MAC frame whose destination MAC address is that of the gateway router at the CATV head-end. Unfortunately, the gateway router knows nothing of the modems internal diagnostics IP address because IANA has designated the IP address range 192.168.xx.xx, as a local subnet that is not to be used in the public Internet. Therefore, the IP packets from system 12 appear to the gateway router to be on a local, invalid subnet and the gateway router consequently discards them. Therefore, the CPE device is unable to communicate with the system 12 diagnostic Application.

Figure 3:
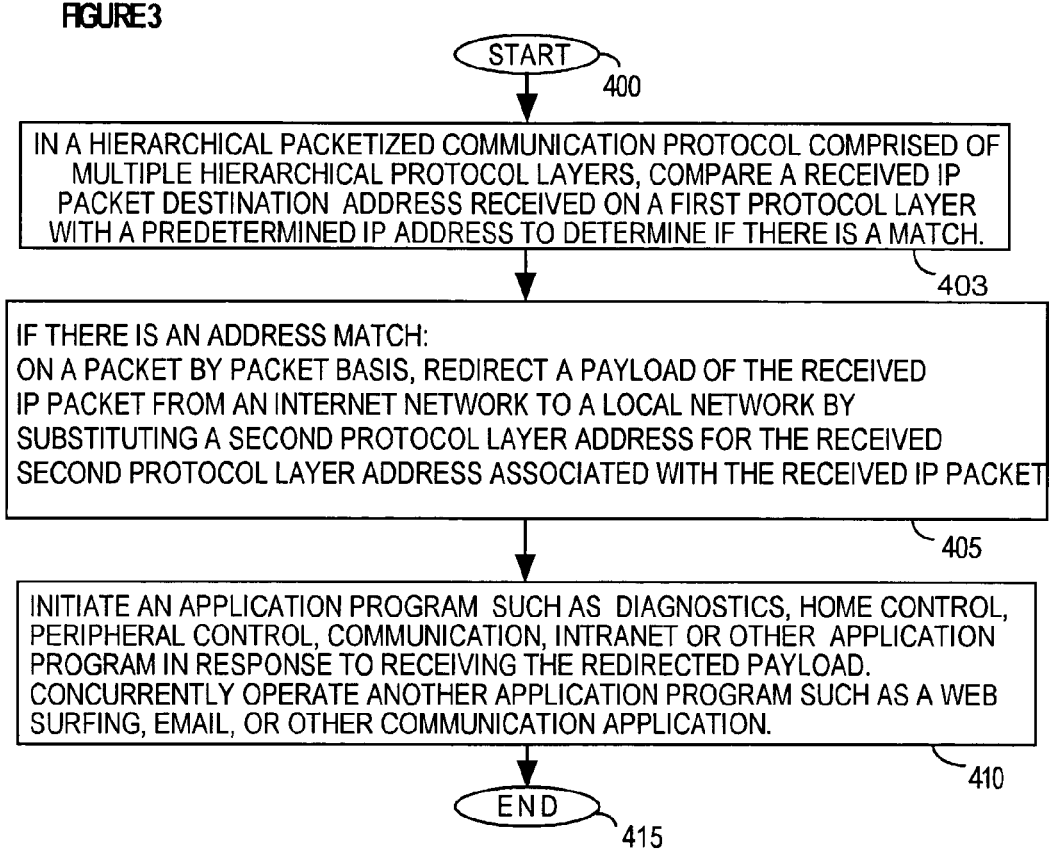
FIG. 3 shows a flowchart of a method for use in a bi-directional communication system for seamlessly communicating data between an Internet network and a local network, according to the invention.

Controller 60 (FIG. 2) in conjunction with system 12, employs the method of FIG. 3 for resolving the described communication problems to facilitate local communication between system 12 and an attached CPE device as well as to enable the CPE device to conduct concurrent Internet and local communication. In step 403 of FIG. 3, following the start at step 400, controller 60 examines a received IP packet destination address in the IP header portion of Ethernet-II/ 802.3 MAC layer data (layer 619 of FIG. 7) destined for the CATV head end. Thereby, controller 60 determines if the received IP packet destination address matches a predetermined IP address. Specifically, controller 60 determines if the received address is within a class of one or more addresses designated for private and non-public Internet usage such as designated cable modem diagnostic Application address 192.168.100.1, for example. In this exemplary cable modem system this diagnostics network address belongs to a special class of IEEE local, private networks including 10.x.x.x, 172.16.0.0 through 172.31.255.255, and 192.168.x.x. address classes. As previously explained, the diagnostics application address is distinct from the standard network address of system 12 (IP address 172.10.2.65). This system 12 standard network address is acquired dynamically by a DHCP client application (item 607 of FIG. 7) and used by an SNMP agent application (item 605 of FIG. 7). In order to prevent unauthorized access to the Internet service, CATV head end operators typically do not divulge a modem's network address. In the absence of an IP address match in step 403, payload data of the received IP packet is conveyed to the received MAC address destination.

Figure 6:
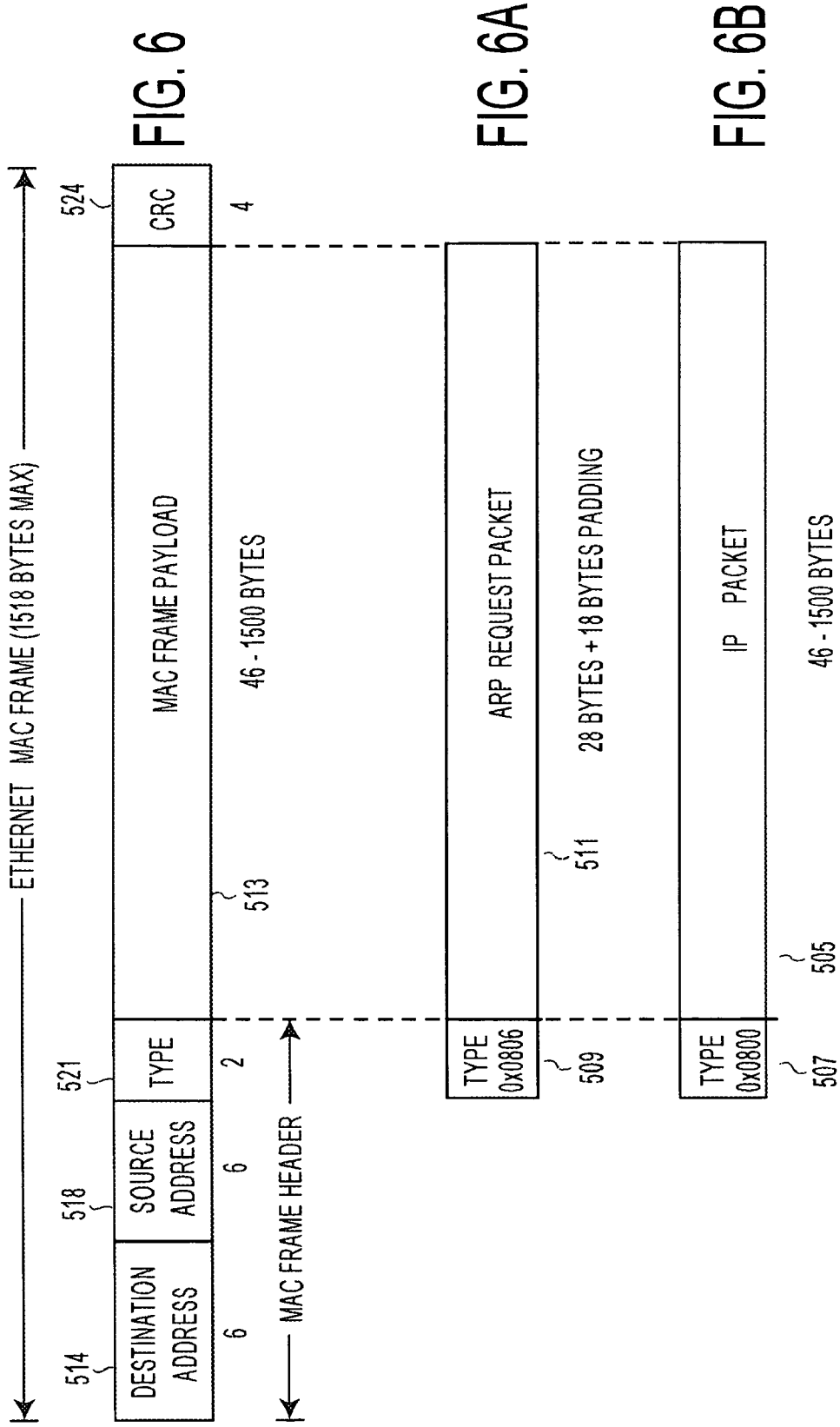
FIG. 6 shows MAC layer encapsulation of IP layer packets received on one interface and forwarded to another interface, according to the invention.

In step 405 of FIG. 3, following an address match in step 403, controller 60 redirects the payloads of IP packets having diagnostic IP address 192.168.100.1 destined for the CATV head end and Internet. Controller 60 redirects these IP layer (first protocol layer) packets on a packet by packet basis to the system 12 local network diagnostic Application (Application 611 of FIG. 7). This is done by substituting the MAC address of the diagnostic network interface in the Ethernet MAC frame layer data (on a second protocol layer, layer 619 of FIG. 7) for the received MAC destination address in that layer. Specifically, in the exemplary MAC frame of FIG. 6 comprising elements 513–524, the MAC address of the diagnostic network interface is substituted for the received MAC destination address in item 514. The substitute MAC address uniquely identifies the recipient as a diagnostic Application 611 (FIG. 7) and the associated IP packet payload data is directed to this Application via TCP/IP stack 615 (FIG. 7). The diagnostic Application (and the other Applications 605–609 and 613 of FIG. 7) communicate with their CPE clients through TCP/IP stack 615 using a standard socket-based applications programming interface (API). This socket API requires that each Application has a fixed Internet Protocol network address and port number in creating and initializing its associated socket. Controller 60 determines the substitute MAC address to be used from an internal database mapping the received IP packet destination address to a substitute MAC address. Thereby the attached CPE device appears directly connected to the system 12 diagnostic Application and payload data in packets with destination IP address 192.168.100.1 are able to be received and processed by the diagnostic Application.

The source IP address associated with the packets from the CPE device to the diagnostic Application is retained and used to uniquely identify this CPE device as the destination for return communication from diagnostic Application 611. Such return communication may comprise IP packets representing a diagnostic web page for display on the CPE device via its resident web browser, for example.

In step 410 of FIG. 3, execution of the diagnostics Application software (item 611 of FIG. 7) is initiated in response to receiving the IP packet payload data redirected in step 405. A wide variety of other Applications may be initiated in system 12 in response to the redirected IP packet data including, for example, (a) home appliance control, (b) peripheral control, (c) a communication or transaction function, and (d) a secure private internet or intranet communication function. Further, system 12 under the direction of controller 60 concurrently receives IP packets from the attached CPE device with IP addresses that do not match the predetermined IP addresses designated for private and non-public Internet usage (as determined in step 403). The payload data of the received non-matching IP packets is conveyed to their respective received MAC address destination addresses to support a first Application, for example, operating concurrently with the second, local network based, diagnostic Application. The first Application may involve communication with remote networks such as the Internet for Applications such as, (a) a web surfing, (b) Email, and (c) Internet phone/videophone. The process of FIG. 3 terminates at step 415.

Figure 4:
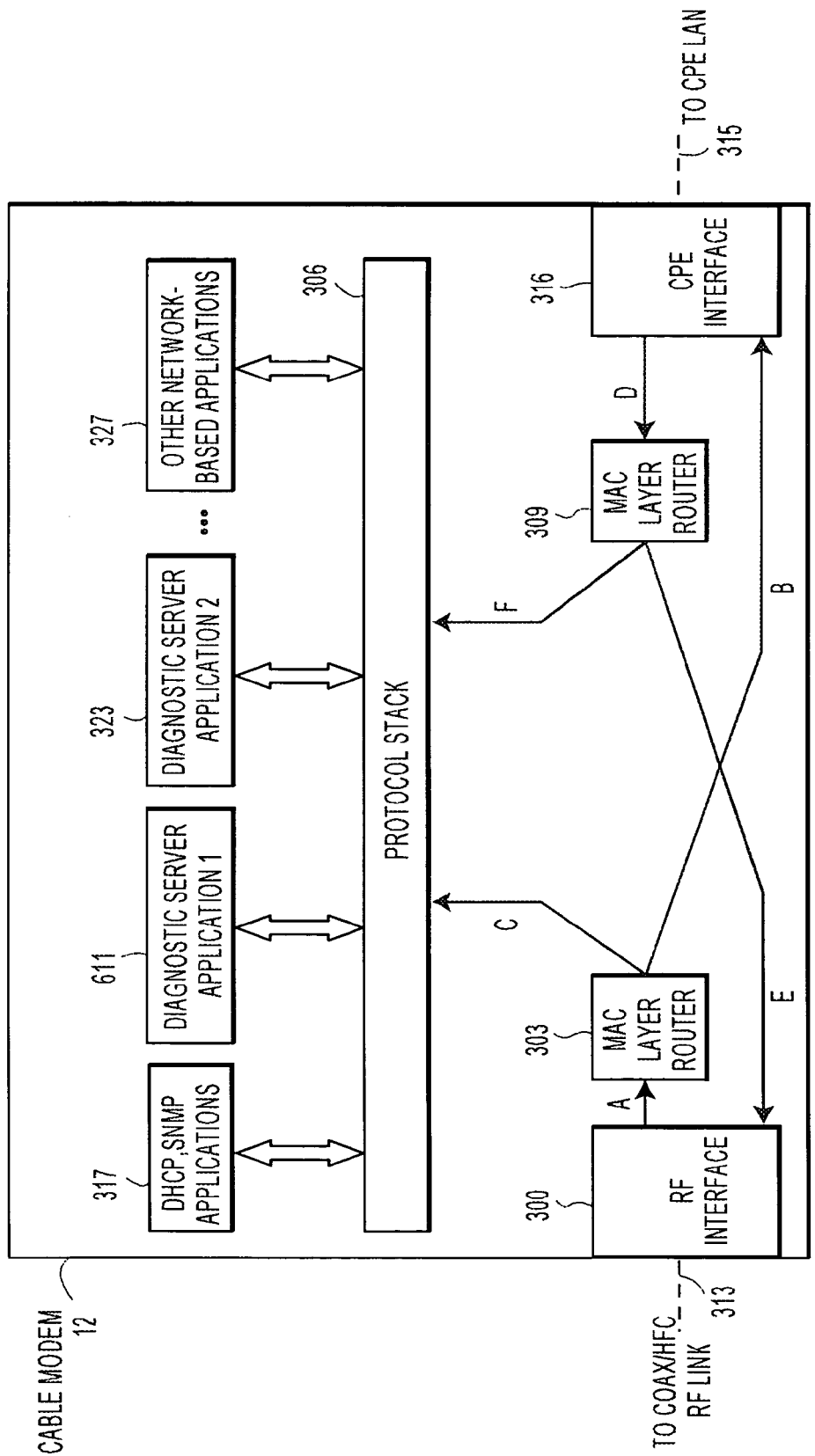
FIG. 4 shows an exemplary cable modem providing bi-directional network bridging communication between Radio Frequency (RF) and Customer Premises Equipment (CPE) interfaces, according to the invention.
Figure 5:
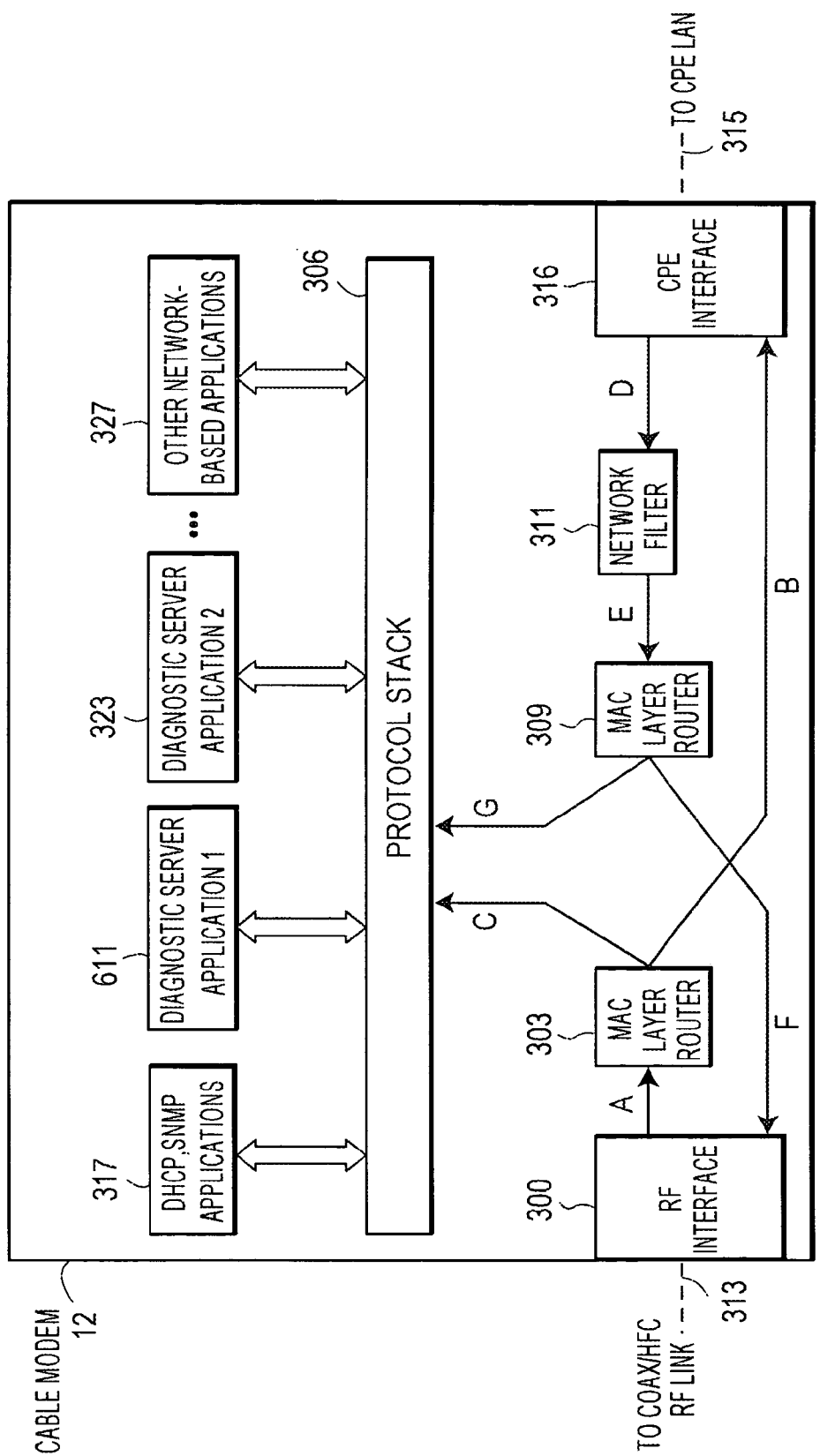
FIG. 5 shows the cable modem of FIG. 4 including a filter for performing parsing and packet classification and for editing Media Access Control (MAC) data link layer packets, according to the invention.

FIG. 4 shows an exemplary cable modem (system 12 of FIGS. 1–5) providing bi-directional network bridging communication between Radio Frequency (RF) and Customer Premises Equipment (CPE) interfaces. FIG. 5 shows the cable modem of FIG. 4 advantageously including a filter 311 for performing parsing and packet classification and for editing Media Access Control (MAC) data link layer packets. Apart from the addition of network filter 311 to a cable modem's CPE input interface, the system of FIG. 5 is the same as that of FIG. 4. In FIG. 5, network filter 311 performs packet classification and MAC header editing of two types of packets received from a CPE device (attached to port 72 port 77 or port 82 of FIG. 2).

Firstly filter 311 (FIG. 5) examines all address resolution protocol (ARP) request packets (comprising elements 509 and 511 of FIG. 6A) received from CPE interface 316 via line 315. If the ARP request packet target IP address is the diagnostic network interface address (e.g., 192.168.100.1) of system 12, the filter substitutes the MAC-layer destination address in the packet (item 514 of FIG. 6) with that of the diagnostic network interface. This is done by substituting the MAC address of the diagnostic Application in the Ethernet MAC frame layer data (layer 619 of FIG. 7) for the received MAC destination address in that layer. The altered MAC frame is forwarded to diagnostic Application 611 via the system 12 protocol stack 615 and the standard MAC layer router 309 (FIG. 5 path DEG).

Secondly filter 311 examines all IP (Internet Protocol) packets (comprising elements 505 and 507 of FIG. 6B) received from CPE interface 316 via line 315. If the IP packet IP destination address is the diagnostic Application address (e.g., 192.168.100.1) of system 12, the filter substitutes the MAC-layer destination address in the packet (item 514 of FIG. 6) with that of the diagnostic network interface. This is done by substituting the MAC address of the diagnostic network interface in the Ethernet MAC frame layer data (layer 619 of FIG. 7) for the received MAC destination address in that layer. The altered MAC frame is forwarded to diagnostic Application 611 via the system 12 protocol stack 615 and the standard MAC layer router 309 (FIG. 5 path DEG). Network filter 311 transparently passes other non-matching packets to MAC layer router 309.

If the packet destination MAC address is not that of the standard or diagnostic network interface, the packet is bridged to the opposite interface 300 employing the system 12 bi-directional network bridge functionality. Specifically, non-matching packets are forwarded from router 309 to RF interface 300 on path F. That is, network-layer packets received on one interface are forwarded to the opposite interface as long as the packet MAC layer encapsulation (FIG. 6) indicates a bridged destination. The destination address is derived from the DOCSIS compatible Ethernet MAC frame encapsulation of IP packets which includes both a 48 bit destination MAC address (item 514 of FIG. 6) and a 48 bit source MAC address (item 518 of FIG. 6). The system 12 bridging capability is bi-directional and employs MAC-layer routing functions 303 for the RF interface and 309 for the CPE interface. In performing a bridging decision router 303 selects between paths C and B and router 309 selects between paths G and F on a packet-by-packet basis based on the packet destination MAC address. Although filter 311 may introduce delay in bridging data through the modem of system 12, the filter may be readily implemented to keep the delay insignificant.

The advantages derived by incorporating filter 311 in system 12 include, (a) it eliminates the need to manually configure network parameters to support local communication between modem system 12 and a CPE device, (b) it enables a CPE device to concurrently browse the Web, exchange email, etc., while exchanging data for local Applications, (c) filter 311 may be implemented in either hardware or software as a simple logic function and may also be added to the RF interface 313, and (d) multiple IP addresses (corresponding to additional cable modem TCP/IP stack 615 network interfaces) may be defined for initiating a variety of functions e.g. Email, fax, Internet phone/videophone, home appliance control, peripheral (e.g. DVD, VCR, set top box, TV, video camera, computer) control, home security control, diagnostic functions, and any other functions operable through an attached CPE device (see Table I).

TABLE I

| IP Address | Mapped to Ethernet MAC address | Function initiated/controlled |
|---|---|---|
| 192.168.100.1 | 00:10:95:FF:00:03 | Diagnostic/test activation and/or control |
| 199.168.100.2 | 00:10:95:FF:00:04 | TV activation and/or control |
| 194.168.100.3 | 00:10:95:FF:00:05 | VCR/DVD activation and/or control |
| 192.169.100.4 | 00:10:95:FF:00:06 | Video camera activation and alarm monitor |
| 192.168.110.1 | 00:10:95:FF:00:07 | Central heating activation and control |
| 192.168.102.1 | 00:10:95:FF:00:08 | Air conditioning activation and/or control |
| 192.168.120.1 | 00:10:95:FF:00:13 | Home security system monitoring |
| 192.169.100.5 | 00:10:95:FF:00:23 | Computer function activation and/or control |
| 172.32.100.1 | 00:10:95:FF:00:24 | Set top box activation and/or control |
| 192.238.100.1 | 00:10:95:FF:00:25 | Fax activation and/or control |
| 195.168.100.1 | 00:10:95:FF:00:15 | Phone/Videophone activation and/or control |
| 192.168.121.1 | 00:10:95:FF:00:26 | Answering machine activation and/or control |
| 232.126.234.1 | 00:10:95:FF:00:19 | Internet function activation and/or control |

Table I shows multiple individual IP addresses being associated with groups of different functions. Each group consists of an IP address/MAC address pair, and is used to define the associated TCP/IP stack network interface. If needed, functions within each group may be individually identified using an associated UDP (User Datagram Protocol) or TCP (Transmission Control Protocol) port number. These IP addresses are transmitted from a remote/local source by an Internet compatible communication protocol (or other communication protocol in different Applications) for control or activation of functions in a decoder system. Thereby, for example, a variety of functions may be remotely (or locally) activated or controlled by accessing a web page at a computer or Internet access device and initiating transmission of the appropriate IP address associated with a specific function as exemplified in Table I. At the decoder, a received IP packet IP address is compared with addresses in a predetermined (or downloaded) database mapping IP addresses to other protocol addresses of a different hierarchical communication layer, e.g., MAC, or MPEG compatible addresses. In a similar manner to that described for the system 12 diagnostic Application, if the IP packet destination address matches an address in the database, an editor in the decoder substitutes a mapped (e.g., MAC layer) address (associated with the matched IP address by the database) for the different hierarchical communication layer protocol addresses.

The architecture of the system of FIGS. 2, (further elaborated in FIGS. 4 and 5) is not exclusive. Other architectures may be derived in accordance with the principles of the invention to accomplish the same objectives. Further, the functions of the elements of the cable modem system 12 and the process steps of FIG. 3 may be implemented in whole or in part within the programmed instructions of controller 60. In addition, the principles of the invention apply to any multi-layered protocol bi-directional communication system and are not limited to DOCSIS compatible modems or to any other type of modem. Also the packet filter element and inventive principles described herein may be extended to operate on IEEE 802.3 packets, IEEE 802.5 token ring compatible packets, IEEE 802.11 packets and MPEG transport packets, as well as different Internet and other protocol packets in addition to the Digital/Intel/Xerox (DIX) Ethernet packets, for example.

What is claimed is:

1. In a bi-directional communication system, a method for directing packetized data to a local network wherein said packetized data comports to hierarchical layers of communication protocols, comprising the steps of:
   comparing a received IP packet destination address in a first protocol layer with a predetermined IP address to determine if there is an address match; and
   redirecting a payload of said received IP packet from an Internet network to said local network in response to said address match by;
   substituting a second protocol layer address, in a packet of said packetized data, for a received second protocol layer destination address corresponding to a destination accessed on said local network, where both the second protocol layer address and the received second protocol layer destination address reside in a second protocol layer different than the first protocol layer.

2. A method according to claim 1, wherein if there is no address match
   said payload of said received IP packet is directed to a different destination than said local network to support a first Application operating concurrently with a different second Application being performed with said local network.

3. A method according to claim 2, wherein
   said first Application is one of (a) a web surfing application, (b) Email, (c) internet phone/videophone, and
   said second Application is one of (i) home appliance control, (ii) peripheral control and (iii) a diagnostic function.

4. A method according to claim 1, wherein
   including the step of
   initiating an Application in response to receiving said directed payload.

5. A method according to claim 1, wherein said redirecting step redirects a payload of said received IP packet to a communication buffer present in said local network to support a local application comprising one or more of, (a) home appliance control, (b) peripheral control, (c) a communication function, (d) a diagnostic function and (e) secure private internet or intranet communication functions.

6. A method according to claim 1, wherein said second protocol layer address is a (MAC) address.

7. In a bi-directional communication device using an internet Protocol (IP), a method for directing IP data, wherein said IP data is structured in the form of hierarchical layers of communication protocols, comprising the steps of:
   comparing a received IP packet IP destination address in a first protocol layer with a predetermined IP address to determine if there is an address match, wherein upon said address match, said IP packet is assigned a as second protocol layer (MAC) destination address that resides in a second protocol layer, in response to said address match; and
   redirecting a payload of said received IP packet using said second protocol layer (MAC) destination address to a device running an Application corresponding to said second protocol layer destination address.

8. A method according to claim 7, including the steps of
   receiving said redirected payload using said second protocol layer (MAC) destination address, and
   initiating said Application in response to receiving said redirected payload.

9. A method according to claim 7, wherein
said predetermined IP address is within a class of one or more addresses designation for private and non-public Internet usage.

10. A method according to claim 7, wherein in said redirecting step
said redirecting step comprises substituting a second protocol layer (MAC) address that was specified in said IP packet before said comparing step with said second protocol layer (MAC) destination address.

11. A method according to claim 7, wherein
said redirecting step redirects a payload of said received IP packet from a first network to a different second network on a packet by packet basis.

12. A method according to claim 11, wherein
said payload of said received IP packet is redirected from a first public internet network to a second local network comprising one of (a) an Ethernet network, (b) a Universal Serial Bus (USB) network and (c) a Home Phoneline Networking Alliance (HPNA) network.

13. A method according to claim 7, wherein
said redirecting step redirects a payload of said received IP packet from a first network to a communication buffer within said bi-directional communication device.

14. A method according to claim 13, wherein
said redirecting step redirects a payload of said received IP packet from a first network to a communication buffer within said bi-directional communication device to support a local application comprising one or more of: (a) home appliance control, (b) peripheral control, (c) a communication function, (d) a diagnostic function and (e) secure private internet or intranet communication functions.

15. A method according to claim 13, wherein
for individual received IP packets said redirecting step redirects payloads of said received IP packets from a first network to a communication buffer within said bi-directional communication device by substituting a second protocol layer (MAC) address that was present in said IP packets before said comparing step for a received second protocol layer (MAC) address.

16. A method according to claim 13, wherein
said bi-directional communication device is a cable modem.

17. A method according to claim 7, wherein
said second protocol layer (MAC) destination address is determined from a database mapping said received IP packet destination address to said second protocol layer (MAC) destination address.

18. In a bi-directional communication system, a method for directing packetized data between different networks using hierarchical layers of communication protocols comprising the steps of:
intercepting a domain name resolution request if a domain name matches a predetermined entry in a domain name database;
translating said intercepted domain name to a predetermined IP address; and
redirecting a payload of a received IP packet destined for said intercepted domain name, wherein said redirecting step substitutes a different MAC layer address for a received MAC layer address.

19. A method according to claim 18 including the step of communicating said predetermined IP address to a requesting client.

\* \* \* \* \*